United States Patent
Matsuo et al.

(10) Patent No.: US 6,705,116 B2
(45) Date of Patent: Mar. 16, 2004

(54) METHOD AND AN APPARATUS FOR BENDING A GLASS SHEET

(75) Inventors: Takayuki Matsuo, Aiko-gun (JP); Kouhei Yoshino, Aiko-gun (JP); Daisuke Ito, Aiko-gun (JP); Hiroshi Ueda, Aiko-gun (JP); Masahiro Tsuchiya, Chita-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/325,971

(22) Filed: Dec. 23, 2002

(65) Prior Publication Data

US 2003/0094017 A1 May 22, 2003

Related U.S. Application Data

(63) Continuation of application No. PCT/JP02/03553, filed on Apr. 9, 2002.

(30) Foreign Application Priority Data

Apr. 10, 2001 (JP) ............................. 2001-110780

(51) Int. Cl.[7] ............................................. C03B 23/025
(52) U.S. Cl. ............................. 65/107; 65/289; 65/290; 65/291
(58) Field of Search ............................. 65/107, 289, 290, 65/291

(56) References Cited

U.S. PATENT DOCUMENTS

| | | | | |
|---|---|---|---|---|
| 4,072,493 A | * | 2/1978 | Imler | 65/107 |
| 4,661,141 A | * | 4/1987 | Nitschke et al. | 65/273 |
| 5,071,461 A | | 12/1991 | Hirotsu et al. | |
| 5,660,609 A | * | 8/1997 | Muller et al. | 65/107 |
| 6,076,373 A | | 6/2000 | Grodziski | |
| 6,357,263 B1 | * | 3/2002 | Yajima et al. | 65/102 |

FOREIGN PATENT DOCUMENTS

| | | |
|---|---|---|
| EP | 0885851 A2 | 12/1998 |
| EP | 0982271 A1 | 3/2000 |
| JP | 2889877 | 2/1999 |

* cited by examiner

Primary Examiner—Sean Vincent
(74) Attorney, Agent, or Firm—Oblon, Spivak, McClelland, Maier & Neustadt, P.C.

(57) ABSTRACT

In a method for bending a glass sheet, comprising using a first mold for supporting a peripheral portion of a glass sheet and a second mold provided inside the first mold; heating the glass sheet put on the first mold to a temperature to bend the glass sheet by gravity; and then transferring the glass sheet onto the second mold to bend the glass sheet only by the second mold, the glass sheet is transferred from the first mold onto the second mold by moving the first mold in a direction to spread the first mold laterally with respect to the second.

12 Claims, 6 Drawing Sheets

METHOD AND AN APPARATUS FOR BENDING A GLASS SHEET

This application is a continuation of application Ser. No. PCT/JP02/03553 filed on Apr. 9, 2002.

TECHNICAL FIELD

The present invention relates to a method and an apparatus for bending a glass sheet.

BACKGROUND ART

A curved glass sheet has been utilized as a windowpane of an automobile. As methods for bending a glass sheet, there have been several sorts of methods, such as press bending and bending by gravity. A glass sheet for the windshield of an automobile has been prepared as stated below. The glass sheet has a peripheral portion of a lower surface supported by a four sided and ring shaped mold having a rectangular or trapezoidal shape substantially conforming to the peripheral portion of the glass sheet, and the glass sheet is heated at a temperature to be bent by gravity.

During the bending operation, it is important (1) to cool the peripheral portion of the glass sheet more rapidly than an inside portion of the glass sheet to maintain the strength at the peripheral portion and (2) to facilitate to bend the glass sheet deeply. Heretofore, a first mold and a second mold combined as a dual frame structure have been used to transfer the glass sheet from the first mold onto the second mold in the course of the bending operation.

Explanation of item (1) will be made. A laminated glass sheet for a windshield is mounted to an automobile body by an adhesive applied to a peripheral portion of the glass sheet. From this viewpoint, the peripheral portion of the glass sheet needs to have sufficiently high strength. In order to obtain the required strength, it is necessary to form a compressive stress layer by natural cooling after having heated the glass sheet. In this case, in order to improve the shaping accuracy of the glass sheet and to sufficiently bend portions of the glass sheet close to edges thereof, it is preferable that the glass sheet is supported only at the edges thereof.

However, when the glass sheet is supported at the edges thereof, a tempered layer is difficult to be formed since the edges are not cooled in a sufficient fashion because of the heat capacity of the molds. In order to cope this problem, the glass sheet is transferred onto the second mold so as to have portions slightly more inward than the edges supported. In other words, the glass sheet has the edges or portions close to the edges (hereinbelow, referred to as the edge portions) supported by the first mold during bending by gravity, and then the glass sheet has portions more inward than the edge portions supported by the second mold. The technique of transference between the molds has been disclosed in, e.g., JP-A-2-30632.

Next, explanation of item (2) will be made. When deep bending or forming a complicated shape is carried out, bending by gravity is made by supporting a glass sheet by a first mold for shallow bend and then transferring the glass sheet onto a second mold for deep bend in the course of the bending operation. It is possible not only to increase the shaping accuracy of, in particular, the corners of the glass sheet but also to improve the quality of the shaped surface by using the two molds having different curvatures to bend the glass sheet in a two-stage fashion by gravity. The technique of transference between the molds for facilitating the bending operation has been disclosed in, e.g., Japanese Patent No. 2889877.

However, in the molds disclosed in each of the two publications, the second mold is provided inside the first mold, and the glass sheet is separated from the first mold during transference by thrusting up the second mold inside the first mold or dropping the first mold. As a result, the first mold and the second mold adjacent thereto move, passing each other in a vertical direction while being adjacent each other.

However, a mechanism for lifting or lowering either one of the first and second molds to make the transference of the glass sheet is complicated. In particular, when the mechanism is configured to thrust up the entire second mold, the bending apparatus has a large size and becomes heavier. This creates a problem that the apparatus needs a driving mechanism having a great deal of output and much consumption electric power for the bending operation.

On the other hand, when the mechanism is configured to move both molds so as to pass each other, the first mold and the second mold need to have a space provided therebetween to prevent both molds from interfering each other. Because of the provision of the space, the second mold needs to be provided in a quite inner side. When the glass sheet is supported in that state, the glass sheet is apt to have mold impression of the second mold marked on an inner side of the glass sheet.

The impression exposed on the front surface of a windowpane is not preferable since it harms the appearance of the product. Although the second mold needs to be located at a position more inward than the peripheral portion of the glass sheet in order to maintain the strength of the peripheral portion at a sufficient level, the second mold is preferably located at a position close to the first mold in the order of mm thereinside since the provision of the second mold at a quite inner side creates impression as stated earlier. The conventional arrangement for making the transparence from the first mold onto the second mold has been difficult to realize it.

The present invention is proposed in consideration of the problems of the prior art. It is an object of the present invention to provide a method and apparatus for bending a glass sheet capable of restraining the creation of mold impression, which is apt to be marked when a glass sheet is transferred from a first mold onto a second mold.

DISCLOSURE OF INVENTION

The present invention provides a method for bending a glass sheet comprising using a first mold for supporting a peripheral portion of a glass sheet and a second mold provided inside the first mold; heating the glass sheet put on the first mold to a temperature to bend the glass sheet by gravity; and then transferring the glass sheet onto the second mold to bend the glass sheet only by the second mold, characterized in that the method comprises moving the first mold in a direction to spread the first mold laterally with respect to the second mold for the transference of the glass sheet from the first mold onto the second mold.

In a preferred mode of the present invention, it is preferable that the method further comprises supporting an edge of the glass sheet by the first mold.

In a preferred mode of the present invention, it is preferable that the method further comprises making the transference of the glass sheet from the first mold on the second mold by rotating the first mold about a rotary shaft.

In a preferred mode of the present invention, it is preferable that the method further comprises making the transference of the glass sheet from the first mold on the second mold by moving the first mold in a direction tangential to a surface of the glass sheet close to an edge thereof.

In a preferred mode of the present invention, it is preferable that the glass sheet is utilized as a windowpane for an automobile.

The present invention also provides an apparatus for bending a glass sheet comprising a first mold supporting a peripheral portion of a glass sheet and a second mold provided inside the first mold; wherein the glass sheet put on the first mold is heated to a temperature to bend the glass sheet by gravity, and then the glass sheet is transferred onto the second mold to bend the glass sheet only by the second mold; characterized in that the first mold includes divided sections for respective sides, the divided sections being configured to move in directions to spread laterally with respect to the second mold.

In a preferred mode of the present invention, it is preferable that the second mold is formed in a ring shape.

In a preferred mode of the present invention, it is preferable that the first mold comprises four bar-shaped member provided along respective four sides.

In a preferred mode of the present invention, it is preferable that the first mold comprises two bar-shaped member provided so as to confront each other.

In a preferred mode of the present invention, it is preferable that each of the bar-shaped members is shorter than a length of one side of the glass sheet.

In a preferred mode of the present invention, it is preferable that the first mold has a substantially L-character shape in section and an upper flange inwardly projected in a reversed L-character shape, and the second mold is provided under the L-character shaped upper flange.

In a preferred mode of the present invention, it is preferable that the glass sheet is utilized as a windowpane for an automobile.

BEST MODE FOR CARRYING OUT THE INVENTION

Now, embodiments according to the present invention will be described in reference to the accompanying drawings.

Figure 1:
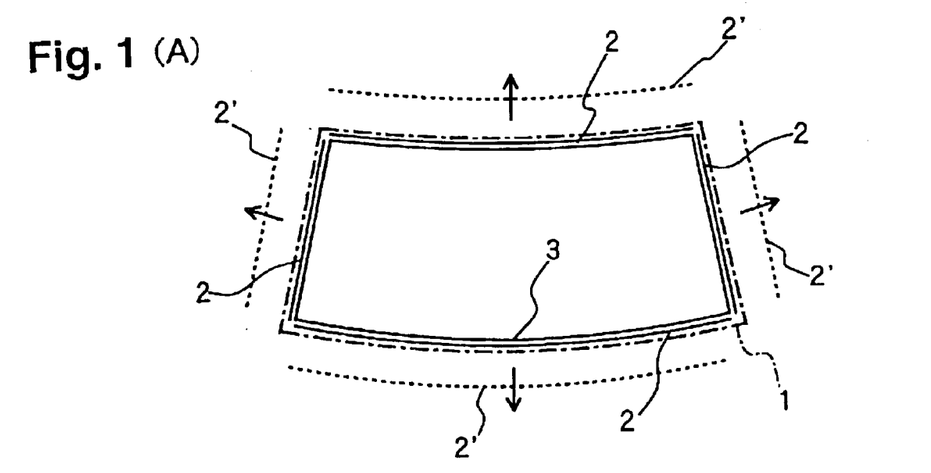
FIGS. 1(A) to (C): Schematic views showing the operations of embodiments of the apparatus for bending a glass sheet according to the present invention FIGS. 2(A) and (B): Schematic views showing systems to move a first mold FIGS. 3(A) and (B): schematic views showing examples of the bending apparatus, wherein both systems shown in FIG. 2 are used in the respective examples

FIG. 1 is schematic views showing an embodiment of the bending apparatus according to the present invention.

The glass sheet bending apparatus comprises a first mold 2 including divided sections for respective four sides so as to substantially correspond to the peripheral portion of a glass sheet 1 having a substantially rectangular or trapezoidal shape or the like and a second mold 3 provided inside the first mold as shown in FIG. 1(A). The second mold 3 is a rectangular ring, which has four sides continuously formed in a substantially rectangular (trapezoidal) shape so as to substantially correspond to the shape of the glass sheet 1.

The first mold 2 and the second mold 3 are curved so as to correspond to a desired bent shape of the peripheral portion of the glass sheet 1, respectively.

When the glass sheet 1 is bent, the glass sheet 1 has a lower surface supported by both of the first mold 2 and the second mold 3 first. The glass sheet 1 is heated at a certain temperature, keeping that state, to be bent by gravity. At that time, the softened glass sheet is supported by shaping surfaces (upper edges) of both of the first mold 2 and the second mold 3.

In order to cool the peripheral portion of the glass sheet to form a compressive stress layer therein for maintaining required strength at the peripheral portion, the glass sheet 1 has portions slightly more inward than the edge portions supported only by the second mold 3. At that time, the first mold 2 opens so as to spread in laterally outward directions (directions indicated by arrows) with respect to the second mold 3 and moves to an open position 2' (indicated by dotted lines). Thus, the glass sheet 1 is supported only by the second mold 3. The glass sheet is naturally cooled, keeping that state, to form the compressive stress layer in the peripheral portion of the glass sheet outside the second mold 3.

FIG. 1(B) shows another embodiment. As shown in FIG. 1(B), the first mold 2 has divided sections provided at two opposite sides (tow sides or right and left sides), and the first mold 2 may be moved toward in directions indicated by arrows so as to spread outwardly in the right and left directions. This embodiment is effective when the bending accuracy at upper and lower long edges of the glass sheet 1 is not essential (e.g., when the glass sheet has a substantially flat shape). In that case, the glass sheet does not need to have the edges supported in terms of bending of the long edges, and the glass sheet can have portions slightly more inward than the edges supported by the second mold from the start without using the first mold. When the first mold has the divided sections provided at only two sides in that manner, the number of the parts decreases to simplify the mechanical structure.

As shown in FIG. 1(C), the divided sections of the first mold 2 at the two opposite sides may have a shorter length than the length of the corresponding lateral edges of the glass sheet 1. Thus, the apparatus can be assembled in a simpler structure. This arrangement is applicable to the four sides in the embodiment shown in FIG. 1(A). In some cases, the first mold 2 may be provided only at one side, depending on the shape of a glass sheet or bending operation required for respective sides of a glass sheet.

Figure 2:
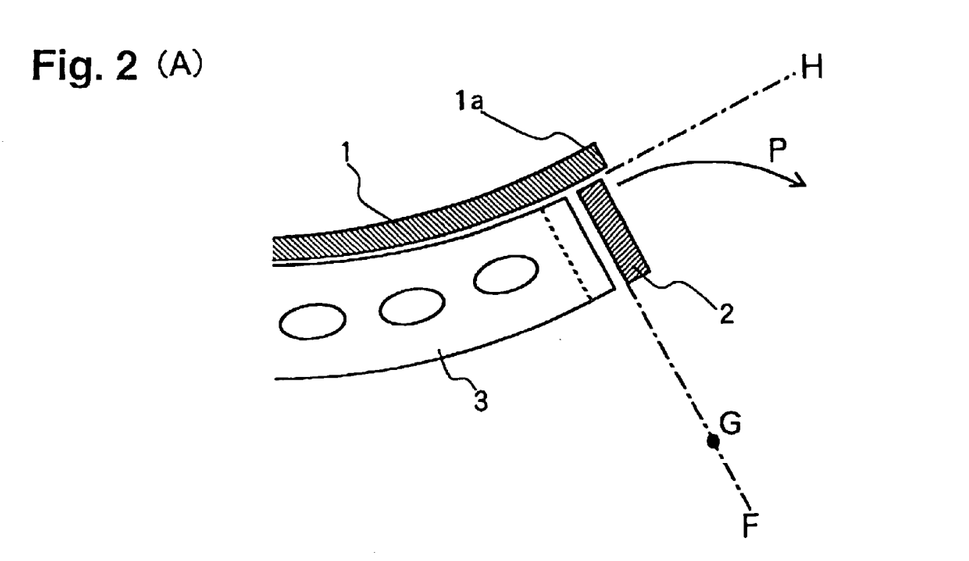

FIG. 2 is a schematic view showing the moving direction of the first mold. FIG. 2(A) shows a rotary movement and FIG. 2(B) shows a parallel movement. The rotary movement shown in FIG. 2(A) or the parallel movement shown in FIG. 2(B) is applicable as a method to spread the first mold laterally with respect to the second mold as stated earlier.

In case of the rotary movement, when the glass sheet 1 has each lower lateral edge supported by the first mold 2 and the second mold 3 as shown in FIG. 2(A), the first mold 2 is rotated outwardly with respect to the second mold 3 and about a point G, which is on a normal F to a tangent H to an edge 1*a* of the glass sheet. Thus, the first mold 2 is moved downwardly outside the tangent line H (in the direction indicated by an arrow P) without getting in contact with the edge 1*a* of the glass sheet 1.

In case of the parallel movement, the first mold 2 may be slid parallel with the tangent H (in the direction indicated by an arrow Q) or in a lower direction than the tangent to be pulled away from the glass sheet 1 as shown in FIG. 1(B). Thus, the first mold 2 is spread outwardly without sliding on the edge 1*a* of the glass sheet 1.

Figure 3:
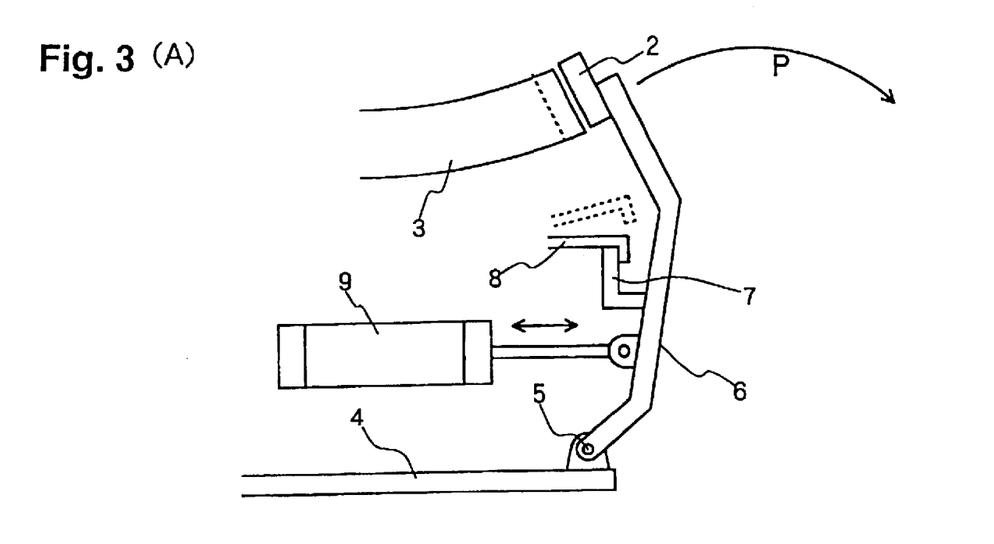

FIGS. 3(A) and 3(B) show specific mechanisms for putting the rotary movement and the parallel movement shown in FIGS. 2(A) and 2(B) into practice, respectively.

In case of the rotary movement, as shown in FIG. 3(A), a rotary shaft 5 is provided on a base 4, and an arm 6 has the second mold 2 fixed thereto. The arm 6 is provided with an air cylinder 9 and a stopper 7, and the stopper 7 is engaged with a hook 8. When the hook 8 is disengaged from the stopper 7, the arm 6 is pushed out by the air cylinder 9. The arm 6 rotates about the rotary shaft 5 as the pivot in the direction indicated by an arrow P, and the first mold 2 moves outwardly with respect to the second mold 3.

In case of the parallel movement, as shown in FIG. 3(B), there is provided a slide bar 10 parallel with the arrow Q, and an arm 11, which is slidable along the slide bar 10, has the first mold 2 fixed thereto. As in the case shown in FIG. 3(A), the arm 11 is provided with the stopper 7 and the air cylinder 9, and the stopper 7 is engaged with the hook 8. When the hook 8 is disengaged from the stopper 7, the arm 11 is pushed out by the air cylinder 9. The arm 11 slides along the slide bar 10 in the direction indicated by the arrow Q, and the first mold 2 moves outwardly with respect to the second mold 3.

As stated earlier, either one of the mechanisms shown in FIGS. 3(A) and 3(B) can be utilized to make the transference from the first mold 2 onto the second mold 3 by a simple structure. Thus, the apparatus can be made smaller, and the power required to drive the apparatus can be reduced, decreasing the production costs.

Figure 4:
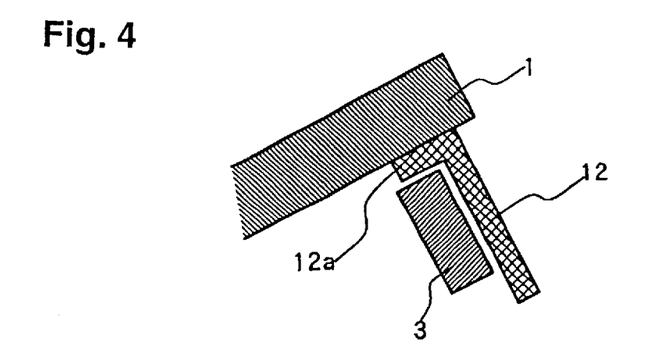
FIG. 4: Schematic view wherein the first mold has an L-character shape in section FIGS. 5(A) and (B): Schematic views of an arrangement for coupling a first mold and a second mold at ends thereof
Figure 7:
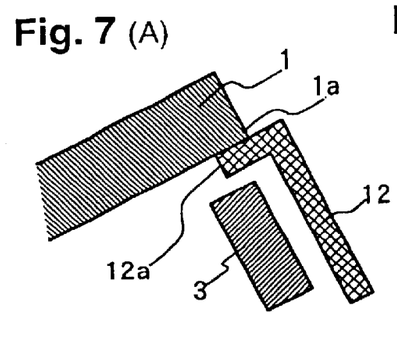

FIG. 4 is a schematic view, wherein the first mold has an L-character shape in section. As shown in this figure, the glass sheet 1 has the lower lateral edges supported by upper flanges 12*a* of a first mold 12 having a reversed L-character shape in section. Thus, the glass sheet can have portions closer to the edge portions supported on the first mold 12 in stable fashion. The glass sheet may have edge ends supported on the upper flanges 12*a*, further facilitating the bending operation (see FIG. 7 stated later).

Since the use of the first mold 12 having a L-character shape allows the second mold 3 to be located under the upper flanges 12*a* having a reversed L-character shape, the second mold 3 can be located at a position closer to the peripheral edge of the glass sheet 1. Since the mold impression of the second mold 3 can be brought near to the peripheral edge of the glass sheet, the mold impression can be covered with sash seals to be made inconspicuous when the glass sheet is mounted to an automobile. In this embodiment, when the first mold 12 is moved so as to spread outwardly as in the embodiment stated earlier, the glass sheet can be transferred onto the second mold 3 without interference with the second mold 3.

Figure 5:
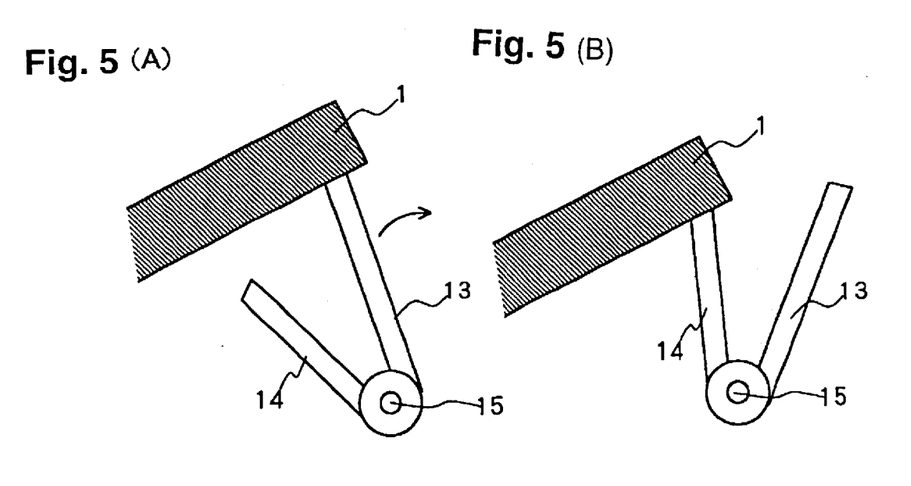

FIG. 5 is a schematic view showing an embodiment, wherein a first mold and a second mold are connected at ends thereof. As shown in this figure, the first mold 13 and the second mold 14 have the ends connected through a rotary shaft 15. In this arrangement, the glass sheet 1 has the lower lateral edges supported by the first mold 13 to be bent by gravity by use of the first mold 13 as shown in FIG. 5(A). After that, the first mold 13 is rotated outwardly about the rotary shaft 15 as the pivot. By this rotary movement, the glass sheet 1 has the lower lateral edges supported by the second mold 14 as shown in FIG. 5(B).

The supporting position of the second mold 14 can be controlled by adjusting the length of both molds or the open angle. In this embodiment, the glass sheet 1 may be supported by the second mold 14 at the same portion thereof as the portion of the glass sheet that were supported by the first mold 13. In this point, this embodiment is also effective when the glass sheet 1 is deeply bent by the second mold 14 as stated later.

Figure 6:
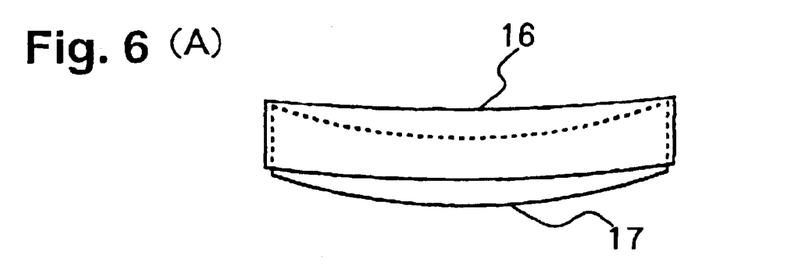
FIGS. 6(A) to (E): Schematic views showing an embodiment, wherein a glass sheet is deeply bent by a second mold FIGS. 7(A) and (B): Schematic views of the arrangement of another embodiment of the present invention FIGS. 8(A) and (B): Schematic views showing the arrangement of another embodiment of the present invention

FIG. 6 is schematic views showing how a glass sheet is transferred from a first mold onto a second mold to be deeply bent. When the glass sheet is deeply bent, the bending is carried out in a two-stage fashion by supporting the glass sheet supported by the first mold for shallow bend, and then transferring the glass sheet onto the second mold for deep bend. First, the second mold 17 for deep bend is provided inside the first mold 16 for shallow bend as shown in FIG. 6(A), and the glass sheet 1 is supported by the first mold 16 as shown in FIG. 6(B).

When the glass sheet is heated keeping that state, the glass sheet is softened and bent along the first mold 16 by gravity as shown in FIG. 6(C). After completion of the bending operation by the first mold 16, the first mold 16 is opened outwardly (forwardly in the drawing sheet) by use of any one of mechanisms according to the present invention, and the glass sheet is transferred onto the second mold 17 as shown in FIG. 6(D). The glass sheet is heated, keeping that state, to be further deeply bent along the second mold 17 as shown in FIG. 6(E). As stated, the present invention is also applicable to the bending operation in a two-stage fashion by use of the first mold and the second mold.

FIG. 7 is schematic views showing another embodiment of the present invention. This embodiment is a modification of the embodiment shown in FIG. 4.

As shown in FIG. 4(A), the glass sheet 1 has the edges 1*a* supported by the upper flanges 12*a* of the first mold 12 having an L-character shape. In this embodiment, the upper flanges 12*a* of the first mold 12 may support only the edges of the glass sheet 1, being slightly slanted as shown in FIG. 7(B). By supporting the edges 1*a* of the glass sheet 1 as stated, the bending operation by the first mold 12 can be made easier.

In the cases shown in FIGS. 7(A) and 7(B), the second mold 3 may be provided at a position to support portions of the glass sheet slightly more inward than the edges thereof for the purpose of forming a compressive stress layer around the peripheral portion of the glass sheet or at a position to support the edges 1*a* of the glass sheet as in the first mold 12 for the purpose of facilitating the bending operation.

Figure 8:
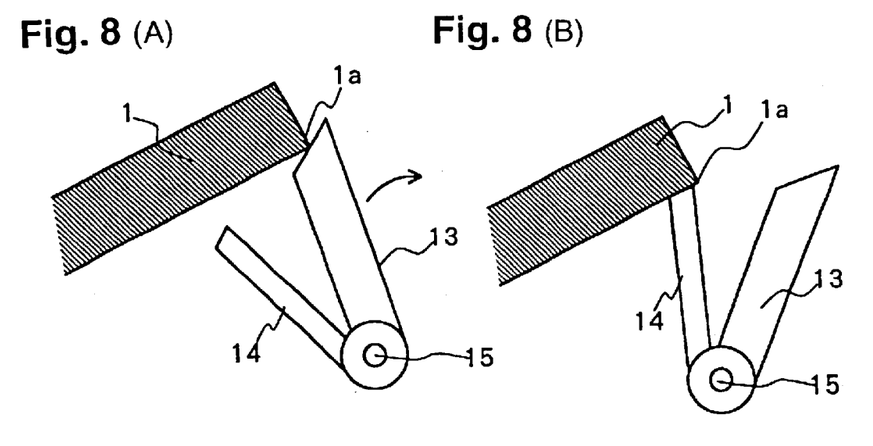

FIG. 8 is schematic views showing another embodiment of the present invention. This embodiment is a modification of the embodiment shown in FIG. 5.

In this embodiment, the glass sheet has the edges 1*a* supported by the first mold 13, the glass sheet is bent in that state as shown in FIG. 8(A), and then the glass sheet 1 is transferred onto the second mold 14 by rotating both molds about the rotary shaft 15 as in the embodiment shown in FIG. 5. By supporting the edges 1*a* of the glass sheet 1 by use of the first mold 13 as stated, the bending operation can be facilitated as in the respective cases shown in FIG. 7.

Industrial Applicability

As explained, the present invention can prevent the first mold and the second mold from interfering each other during transference of a glass sheet since the first mold is spread laterally with respect to the second mold. As a result, the second mold can be brought as close as possible to the first mold to transfer the glass sheet from the first mold onto the second mold at a position of the glass sheet close to the edges, where the mold impression of the second mold is not conspicuous. The present invention can make the apparatus smaller and reduce the production costs since any one of the mechanisms has a simple structure and needs no great power. Before transferring the glass sheet onto the second mold, the glass sheet may be supported by the first mold only or by both of the first mold and the second mold.

It is possible to improve the shaping accuracy of a glass sheet by supporting the lateral edges of the glass sheet at the L-character shaped upper flanges, and it is possible to make the transference of a glass sheet at a position closest to the first mold by providing the second mold under the L-character shaped upper flanges of the first mold having. As a result, it is possible to bring the mold impression on the glass sheet as close as possible to a location close to the peripheral portion of the glass sheet to make the mold impression inconspicuous with cooled portions having a required width ensured at the edges of the peripheral portion of the glass sheet.

Additionally, it is possible to reliably prevent the first mold and the second mold from interfering each other during transference of a glass sheet by spreading the first mold laterally so as to pull the first mold away from the glass sheet. As a result, it is possible to bring the first mold as close as possible to the glass edge. When the glass sheet is supported by the second mold, it is possible to provide the second mold at a position closest to the first mold so as to make mold impression on the glass sheet inconspicuous.

Further, it is possible not only to facilitate the bending operation, in particular to bend portions of a glass sheet close to the edges thereof with good precision, but also to bring the second mold closer to the edges.

The entire disclosure of Japanese Patent Application No. 2001-110780filed on Apr. 10, 2001 including specification, claims, drawings and summary is incorporated herein by reference in its entirety.

What is claimed is:

1. A method for bending a glass sheet, comprising using a first mold for supporting a peripheral portion of a glass sheet and a second mold provided inside the first mold; heating the glass sheet put on the first mold to a temperature to bend the glass sheet by gravity; and then transferring the glass sheet onto the second mold to bend the glass sheet only by the second mold,
   the method comprising making the transference of the glass sheet from the first mold onto the second mold by moving the first mold in a direction to spread the first mold laterally with respect to the second mold.

2. The method according to claim 1, further comprising supporting an edge of the glass sheet by the first mold.

3. The method according to claim 1, further comprising making the transference of the glass sheet from the first mold on the second mold by rotating the first mold about a rotary shaft.

4. The method according to claim 1, further comprising making the transference of the glass sheet from the first mold on the second mold by moving the first mold in a direction tangential to a surface of the glass sheet close to an edge thereof.

5. The method according to claim 1, wherein the glass sheet is utilized as a windowpane for an automobile.

6. An apparatus for bending a glass sheet, comprising a first mold supporting a peripheral portion of a glass sheet and a second mold provided inside the first mold; wherein the glass sheet put on the first mold is heated to a temperature to bend the glass sheet by gravity, and then the glass sheet is transferred onto the second mold to bend the glass sheet only by the second mold;
   the first mold including divided sections for respective sides, the divided sections being configured to move in directions to spread laterally with respect to the second mold.

7. The apparatus according to claim 6, wherein the second mold is formed in a ring shape.

8. The apparatus according to claim 6, wherein the first mold comprises four bar-shaped members provided along respective four sides.

9. The apparatus according to claim 6, wherein the first mold comprises two bar-shaped members provided so as to confront each other.

10. The apparatus according to claim 8, wherein each of the bar-shaped members is shorter than a length of one side of the glass sheet.

11. The apparatus according to claim 6, wherein the first mold has a substantially L-character shape in section and an upper flange inwardly projected in a reversed L-character shape, and the second mold is provided under the L-character shaped upper flange.

12. The apparatus according to claim 6, wherein the glass sheet is utilized as a windowpane for an automobile.

* * * * *